C. TRETTIN.
ROTARY CONVERTER.
APPLICATION FILED JUNE 7, 1915. RENEWED NOV. 7, 1918.

1,309,001. Patented July 8, 1919.

Inventor:
Carl Trettin
By Knight Bros
his Attorney

UNITED STATES PATENT OFFICE.

CARL TRETTIN, OF BERLIN, GERMANY, ASSIGNOR TO SIEMENS-SCHUKERT WERKE G. M. B. H., OF BERLIN, GERMANY, A CORPORATION OF GERMANY.

ROTARY CONVERTER.

1,309,001.  Specification of Letters Patent.  Patented July 8, 1919.

Application filed June 7, 1915, Serial No. 32,593. Renewed November 7, 1918. Serial No. 261,554.

*To all whom it may concern:*

Be it known that I, CARL TRETTIN, a German citizen, and resident of Berlin, Germany, have invented certain new and useful Improvements in Rotary Converters, of which the following is a specification.

This invention relates to rotary converters for converting continuous current of one voltage into continuous current of another voltage, and consists in brief in providing a converter of this kind with proper commutating poles and properly displacing the brushes of one commutator to those of the other for improving the commutation.

In rotary converters of the class specified the armature reactions as well as the reactance voltages of the coils during commutation will approximately compensate each other, if certain conditions are fulfilled. For compensating the armature reactions, the condition is that the no-load losses of the motor side of the converter are sufficiently small, and for compensating said reactance voltages it is necessary that the magnetic stray lines which are concatenated with only one of the windings can be neglected. It is therefore only possible to obtain a good commutation without the employment of special commutating poles, if both these conditions are fulfilled. In machines carrying great loads the effects which are due to armature reaction and reactance voltage can no more be neglected in order to secure good commutation. If in such cases commutating poles of the normal construction are employed, these poles would certainly favorably act upon the short-circuit winding of the one side of the converter, the commutating conditions of the other side, however, would be rendered more unfavorable. This is due to the fact that the short-circuit coils in the armature of the converter are arranged one above the other and that the reactance voltages are of a direction opposite to each other.

In order to avoid these disadvantages, according to my invention the commutating zones of the two sides of the converter are displaced relatively to each other and especial commutating pole constructions are provided for these two commutating zones.

Figure 1:
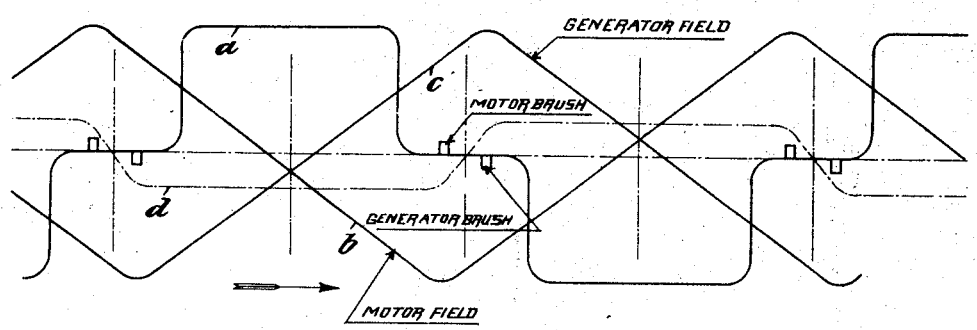
Figure 2:
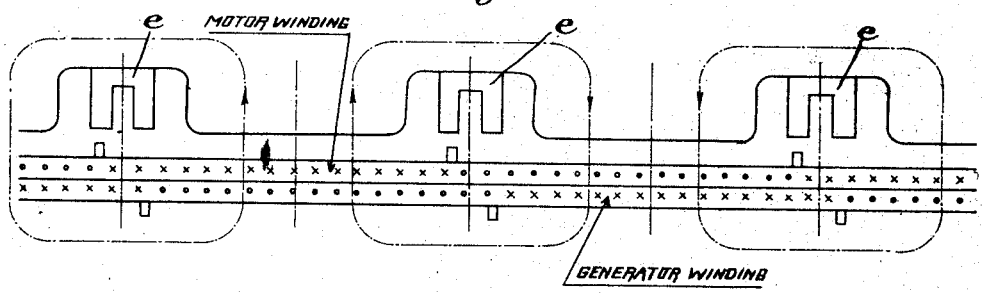
Figure 3:
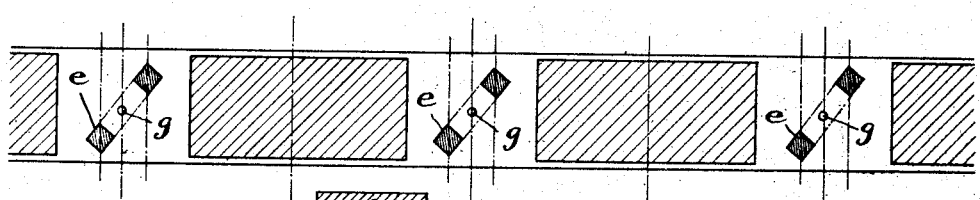
Figure 4:
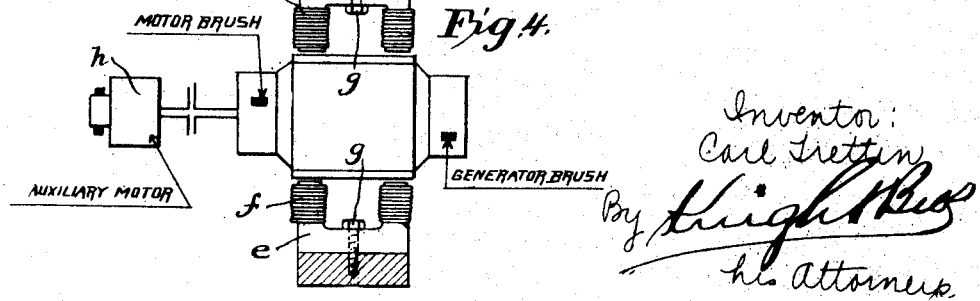

Figure 1 is a diagrammatic view showing the fields of a rotary converter according to the present invention, Figs. 2 and 3 show the combination of the windings of the same converter with an adjustable commutating pole, Fig. 4 is a diagrammatic view of a modification.

Herein $a$ indicates the main field of the converter, $b$ the motor field and $c$ the generator field, the armature being assumed to rotate in a direction as indicated by the arrow. The two fields $b$ and $c$ are relatively displaced to each other, as can be seen from the drawing, according to the above mentioned displacement of the brushes. If the no-load losses of the motor side are negligibly small, the resulting armature field $d$ is obtained by adding the fields $c$ and $b$. By the displacement of the brushes of one commutator to those of the other two commutating zones will be obtained which are separated in space and which may be controlled independently from each other by especial commutating fields. The strength of the required commutating field is dependent on the one hand upon the angle of displacement, as shown in Fig. 1, and on the other hand upon the strength of the armature current. The commutating fields therefore may either be excited by the main current itself or by a current which is proportionate to the same. In the present example, where the no-load losses of the motor are neglected, the commutating fields required for those commutating zones which are associated to each other are of equal dimensions but of opposite directions. These commutating fields according to my invention now are generated by the commutating pole shown in Figs. 2 and 3. This pole consists of a double-shanked U-shaped iron body $e$, and carries the commutating coils $f$ upon its shanks. As the commutating field needs to be only of small strength as a rule a small iron width of the commutating pole will be sufficient, such as indicated in Fig. 3. The commutating pole now is adapted to be adjusted by means of a pivot screw bolt $g$ or the like at the center of its yoke and is set according to the temporary brush position in such a manner that the two shanks will be positioned above the appertaining commutating zones.

If the no-load losses of the motor side are of such an amount that they cannot be neglected, the construction shown in Fig. 4 will enable to use one and the same commutating field for obtaining good commutation. In this case the motor winding is mounted in the usual manner in the upper part of the slots of the armature, in order to render its leakage small as compared with that of the generator winding. Furthermore the converter may be mechanically coupled with an auxiliary motor $h$ serving to furnish the no-load losses of the motor side. Such an auxiliary motor possesses the further advantage that it may be used for starting the converter, thus dispensing with an especial starting device for the motor side which is especially desirable in high voltage power stations.

Having thus described my invention I claim as new and desire to secure by Letters Patent of the United States:—

1. A rotary converter for converting continuous current of one voltage into continuous current of another voltage, comprising an armature having two windings, a commutator connected to each of said windings, a set of brushes on each of said commutators, said sets of brushes being displaced relatively to each other, main poles, and commutating poles intermediate between said main poles for generating distinct commutating zones for each of said windings.

2. A rotary converter for converting continuous current of one voltage into continuous current of another voltage, comprising an armature having two windings, a commutator connected to each of said windings, a set of brushes on each of said commutators, said sets of brushes being displaced relatively to each other, main poles, and double-shanked U-shaped commutating poles intermediate between said main poles, the shanks of said commutating poles being positioned in the commutating zone of each of said windings.

3. A rotary converter for converting continuous current of one voltage into continuous current of another voltage, comprising an armature having two windings, a commutator connected to each of said windings, a set of brushes on each of said commutators, said sets of brushes being displaced relatively to each other, main poles, and double-shanked U-shaped commutating poles intermediate between said main poles, the shanks of said commutating poles being positioned in the commutating zone of each of said windings, said commutating poles being mounted to permit rotation for adjusting the same relatively to said commutating zones.

4. A rotary converter for converting continuous current of one voltage into continuous current of another voltage, comprising an armature having two windings, a commutator connected to each of said windings, a set of brushes on each of said commutators, said sets of brushes being displaced relatively to each other, main poles, and commutating poles intermediate between said main poles for generating distinct commutating zones for each of said windings, and an auxiliary motor mechanically coupled with said converter for compensating the no-load losses of the motor side of said converter, whereby said auxiliary motor may be used for starting said converter.

5. A rotary converter for converting continuous current of one voltage into continuous current of another voltage, comprising an armature having two windings, a commutator connected to each of said windings, a set of brushes on each of said commutators, said sets of brushes being displaced relatively to each other, main poles, and double-shanked U-shaped commutating poles intermediate between said main poles, the shanks of said commutating poles being positioned in said commutating zones, and an auxiliary motor mechanically coupled with said converter for compensating the no-load losses of the motor side of said converter, whereby said auxiliary motor may be used for starting said converter.

6. A rotary converter for converting continuous current of one voltage into continuous current of another voltage, comprising an armature having two windings, a commutator connected to each of said windings, a set of brushes on each of said commutators, said sets of brushes being displaced relatively to each other, main poles, and double-shanked U-shaped commutating poles intermediate between said main poles, the shanks of said commutating poles being positioned in the commutating zone of each of said windings, said commutating poles being mounted on a pivot so as to be adjustable relatively to said commutating zones, and an auxiliary motor mechanically coupled with said converter for compensating the no-load losses of the motor side of said converter, whereby said auxiliary motor may be used for starting said converter.

In testimony whereof I have hereunto set my signature in the presence of two subscribing witnesses.

CARL TRETTIN.

Witnesses:
 WOLDEMAR HAUPT,
 HENRY HASPER.

Copies of this patent may be obtained for five cents each, by addressing the "Commissioner of Patents, Washington, D. C."